Figure 1:
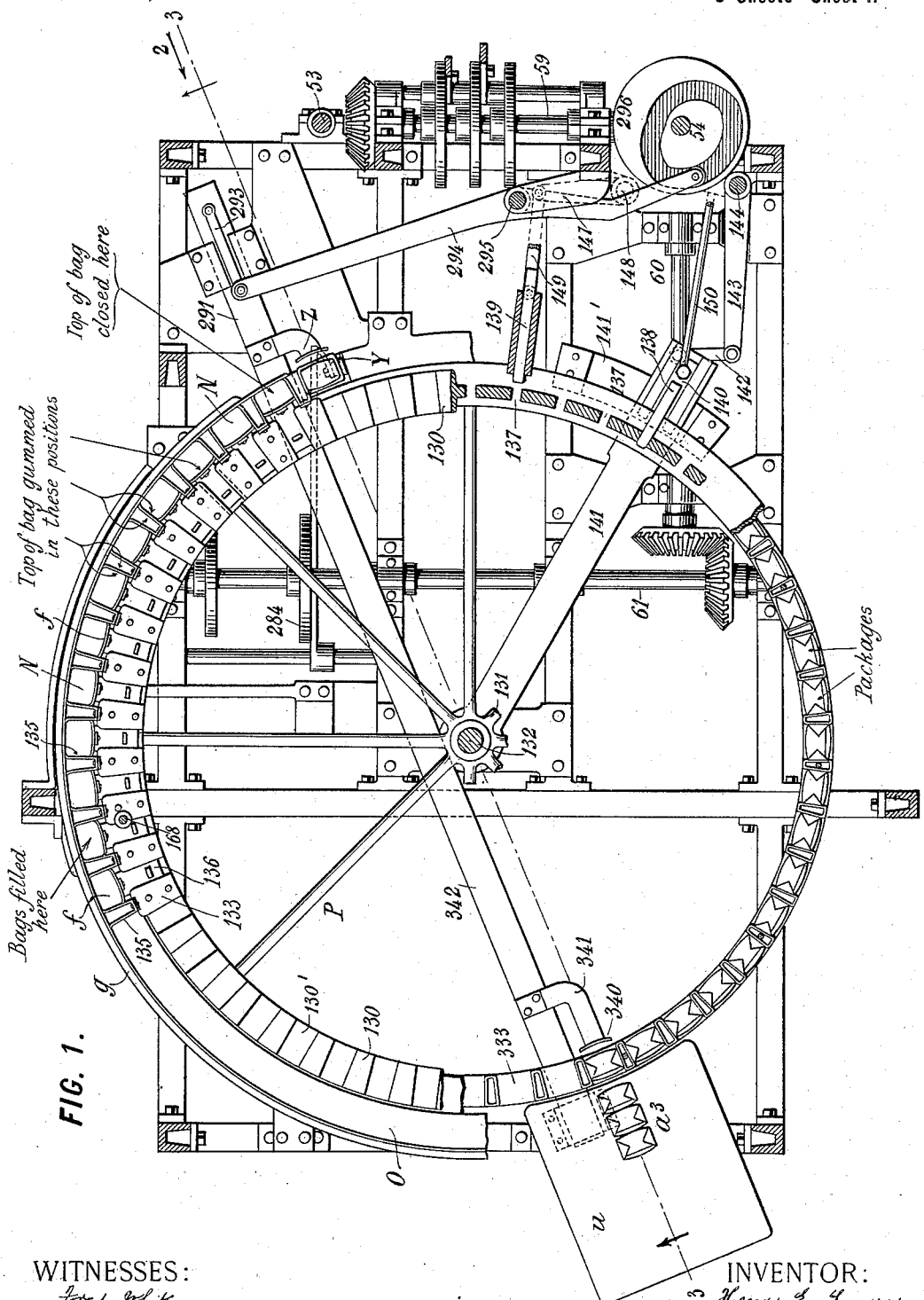

No. 609,472. Patented Aug. 23, 1898.
H. E. SMYSER.
PACKAGING MACHINE.
(Application filed Mar. 27, 1897.)
(No Model.) 5 Sheets—Sheet 1.

WITNESSES:
Fred White
Thomas F. Wallace

INVENTOR:
Henry E. Smyser,
By his Attorneys.

No. 609,472. Patented Aug. 23, 1898.
H. E. SMYSER.
PACKAGING MACHINE.
(Application filed Mar. 27, 1897.)
(No Model.) 5 Sheets—Sheet 2.

WITNESSES:
INVENTOR:
Henry E. Smyser,
By his Attorneys.

No. 609,472. Patented Aug. 23, 1898.
H. E. SMYSER.
PACKAGING MACHINE.
(Application filed Mar. 27, 1897.)
(No Model.) 5 Sheets—Sheet 3.
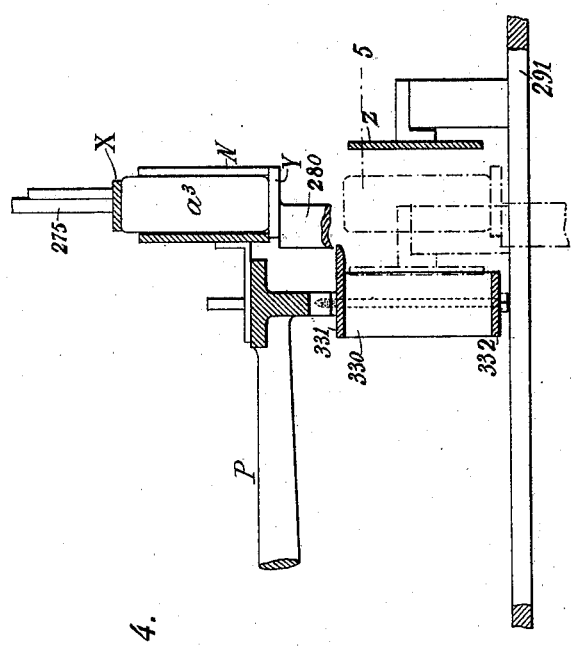
FIG. 4.
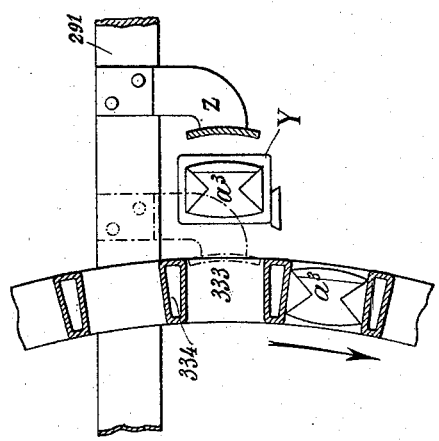
FIG. 5.
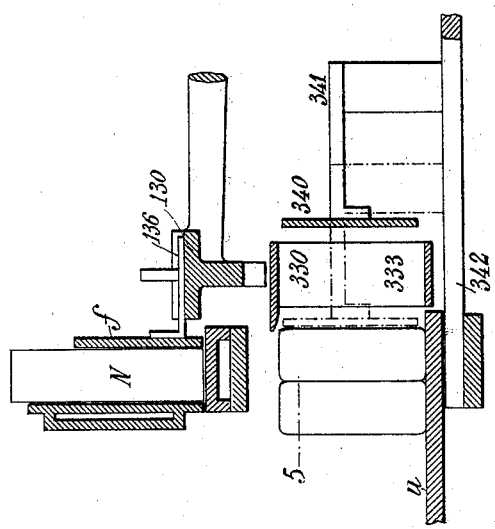
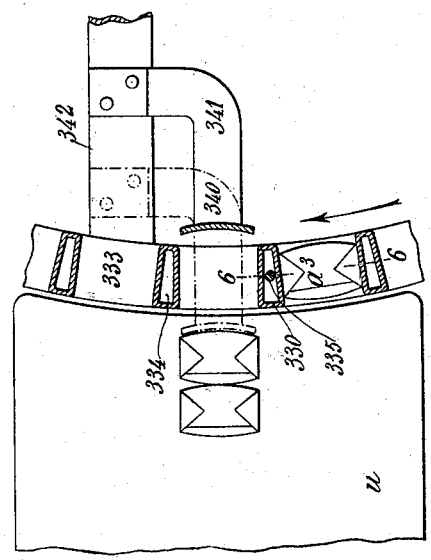
WITNESSES:
Fred White
Thomas F. Wallace
INVENTOR:
Henry E. Smyser,
By his Attorneys,
Arthur C. Fraser & Co No. 609,472. Patented Aug. 23, 1898.
H. E. SMYSER.
PACKAGING MACHINE.
(Application filed Mar. 27, 1897.)
(No Model.) 5 Sheets—Sheet 4.
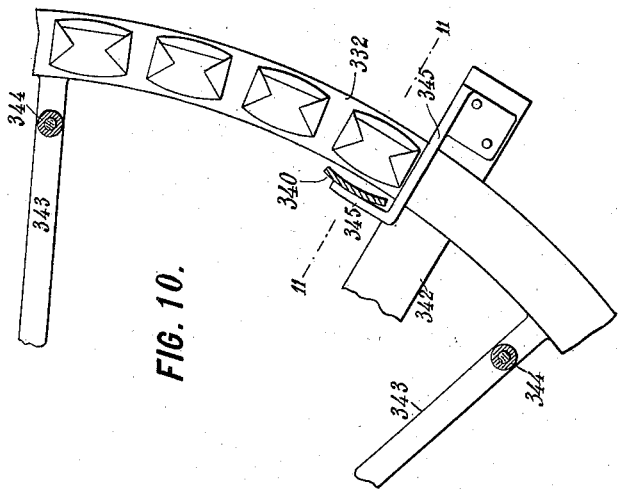
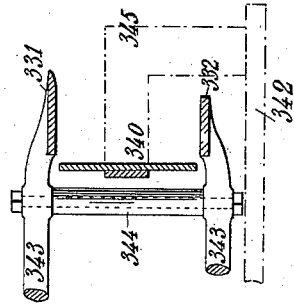
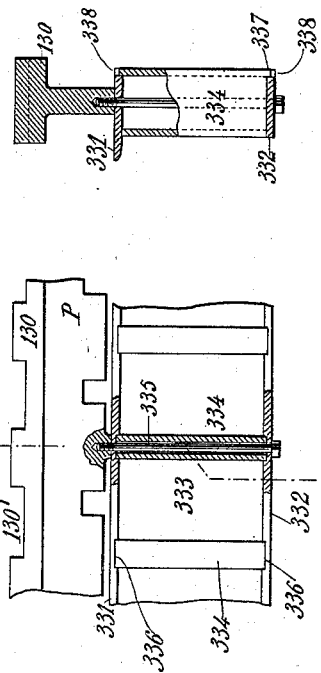
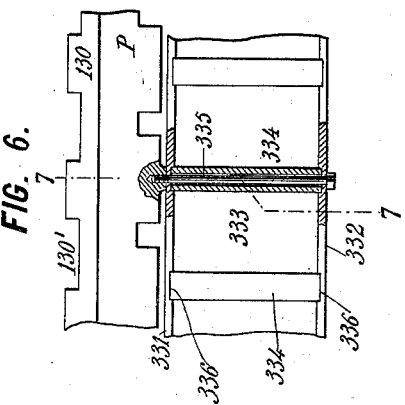
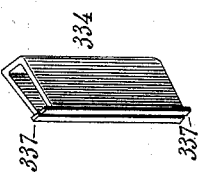
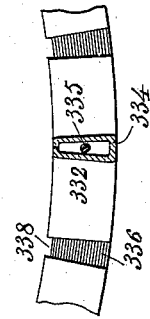
WITNESSES:
Fred White
Thomas F. Wallace
INVENTOR:
Henry E. Smyser,
By his Attorneys,
Arthur E. Fraser & Co.
THE NORRIS PETERS CO., PHOTO-LITHO., WASHINGTON, D. C.

No. 609,472. Patented Aug. 23, 1898.
H. E. SMYSER.
PACKAGING MACHINE.
(Application filed Mar. 27, 1897.)
(No Model.) 5 Sheets—Sheet 5.

WITNESSES:
Fred White
Thomas F. Wallace

INVENTOR:
Henry E. Smyser,
By his Attorneys.

UNITED STATES PATENT OFFICE.

HENRY E. SMYSER, OF NEW YORK, N. Y., ASSIGNOR TO ARBUCKLE BROTHERS, OF SAME PLACE.

PACKAGING-MACHINE.

SPECIFICATION forming part of Letters Patent No. 609,472, dated August 23, 1898.

Application filed March 27, 1897. Serial No. 629,521. (No model.)

*To all whom it may concern:*

Be it known that I, HENRY E. SMYSER, a citizen of the United States, residing in New York, (Brooklyn,) in the county of Kings and State of New York, have invented certain new and useful Improvements in Packaging-Machines, of which the following is a specification.

The object of this invention is to provide an improved and simplified construction of carrier for transporting packages in a packaging-machine, either during the period while they are being dried or whenever they are being carried for any purpose from one part of the machine to another. By "packaging - machines" I mean any machine in which the package is handled or operated upon, such machines, however, being ordinarily those in which the package is formed; or, to be more precise, they are machines in which a paper bag (either made in the same machine or previously made) is carried, filled with the material to be packed, and closed to form a package; or another type of packaging-machine is that wherein a material in the form of a cake or block or a series of objects or materials grouped into such form is wrapped about by a sheet of paper to form a package.

The accompanying drawings show my present invention as applied to a machine for making paper bags, filling them with sugar or other material, gumming and closing the tops of the bags to form packages, drying these packages, and finally delivering them out of the machine. The particular machine of this character to which my invention is most immediately applied is fully disclosed in my Patent No. 564,722, dated July 28, 1896, which may be referred to for a full understanding of all those parts of the machine which are herein only partly shown or described and which have no necessary connection with my present invention.

Figure 2:
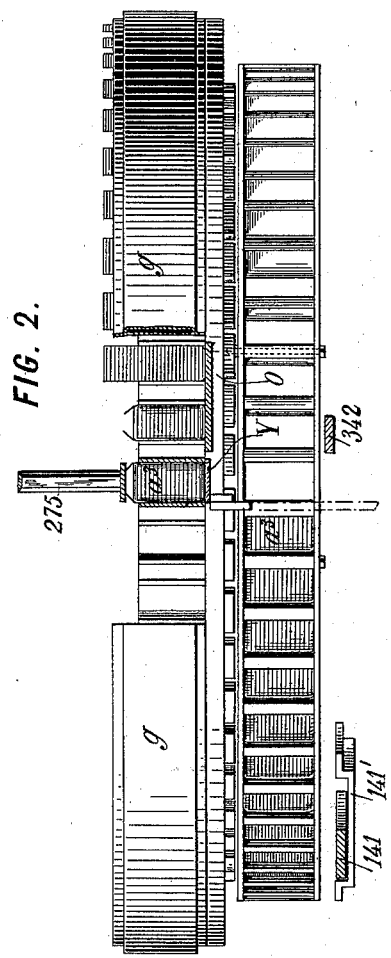
Figure 3:
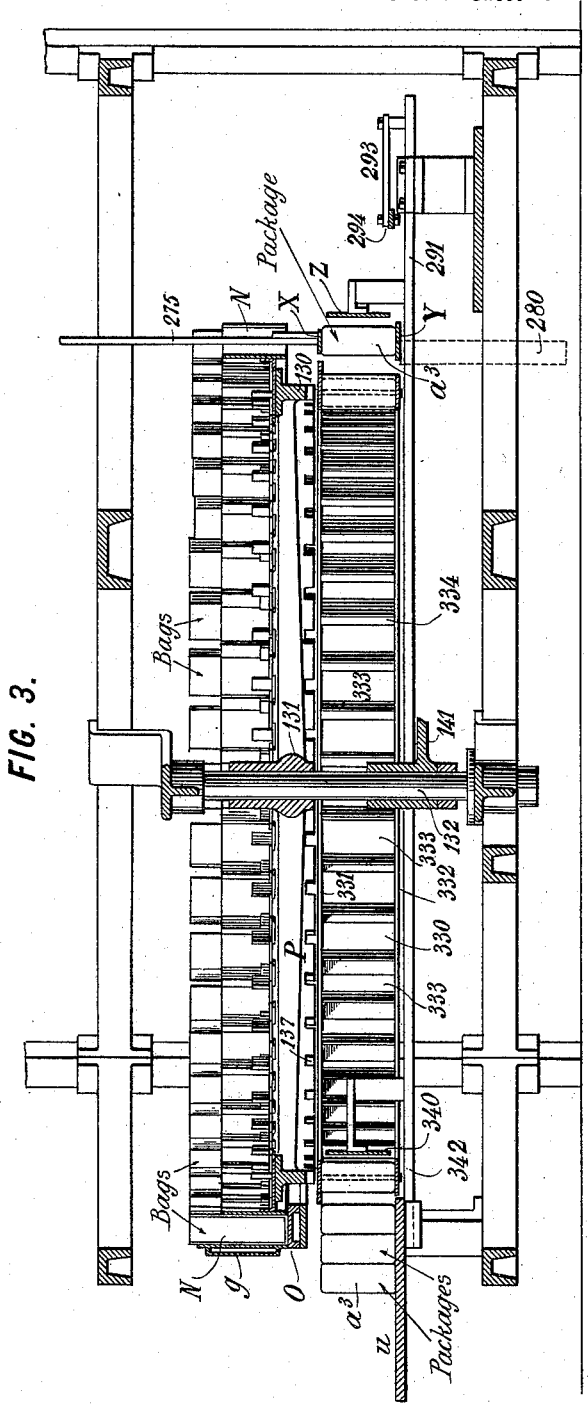
Figure 14:
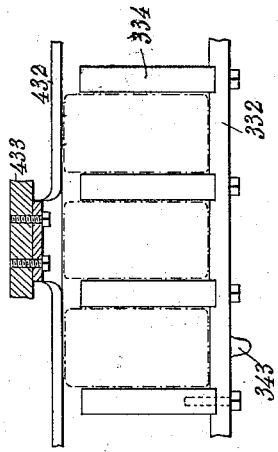
Figure 15:
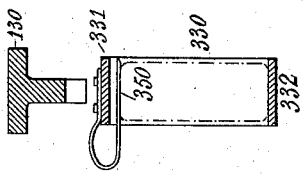
Figure 12:
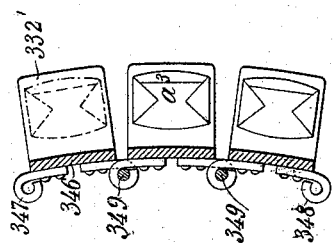
Figure 13:
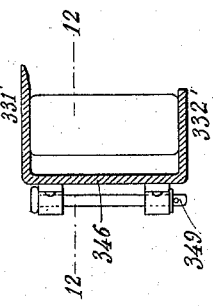

Figure 1 is a horizontal section, partly broken away, in different planes to show different portions of the construction. Fig. 2 is an elevation of the main revolving part of the machine constituting the bag-pockets and package-carrier viewed obliquely in the direction indicated by the arrow 2 in Fig. 1, all extraneous and intervening portions of the mechanism being removed. Fig. 3 is an oblique diametrical section in a vertical plane indicated by the line 3 3 in Fig. 1. Fig. 4 is a fragmentary view on a larger scale, the section being taken in the same plane as Fig. 3, with the parts shown in a somewhat different position. Fig. 5 is a horizontal fragmentary section on the same scale as Fig. 4, being cut on the plane of the line 5 5 therein. Fig. 6 is a fragmentary vertical section on the line 6 6 in Fig. 5. Fig. 7 is a vertical transverse section on the line 7 7 in Fig. 6. Fig. 8 is a fragmentary sectional plan showing a portion of the bottom ring in Figs. 6 and 7 and a section of one of the partitions. Fig. 9 is a perspective of one of the partitions. Fig. 10 is a fragmentary horizontal section in the same plane as Fig. 5, showing a modification. Fig. 11 is a vertical section on line 11 11. Figs. 12 and 13 show a chain carrier, Fig. 12 being a horizontal section and Fig. 13 a vertical cross-section. Fig. 14 is a front view of part of a modified construction of carrier. Fig. 15 is a transverse section showing a detail of construction.

In the accompanying drawings I have not shown the mechanism for pasting and folding sheets of paper to form bags, nor for inserting these bags in the succession of pockets constituting the bag-carriers, nor for weighing or measuring out the material to be packed, nor for discharging this material in weighed or measured charges into the successive bags, nor for applying glue or gum to the mouths of the bags, nor for folding in the mouths or tops of the bags to form closed packages. So far as my present invention is concerned all these operations might be performed by hand. I have shown automatic mechanism in my said Patent No. 564,722 for performing all the operations except the automatic weighing and dumping of the charges of material, and automatic mechanism for this purpose is shown in my Patent No. 570,109, dated October 27, 1896. In so far as the elements or parts shown in the accompanying drawings are identical with the corresponding parts in my said patent No. 564,722 I have here designated them by the same letters or numbers of reference.

Referring to the drawings, let 132 designate a vertical shaft mounted in bearings in a suitable frame of any practicable construction and carrying a wheel P, which may be constructed with spokes and with a circular rim 130, and which carries a series of pockets N N, open at top and bottom, and which slide around over a circular table O. The construction of these pockets may be greatly varied, all that is essential being that they shall constitute carrying cells or compartments adapted to receive the bags and hold them while they are filled and while their tops are closed to form packages. I will briefly describe the construction shown, it being understood that this construction has no special relevance to my present invention. The rim 130 has radial slideways 130' planed in its upper surface, in which work slides 136, which carry the movable back walls $f$ of the pockets, the slides being held down in the ways by plates 133 overlapping them and which are screwed down to the rim 130 and have fixed to them bent U-shaped plates 135, which constitute the side walls of the pockets. The outer sides of the pockets are closed by a stationary wall $g$. The purpose of the movable wall $f$, mounted on the slide 136, is to enable the pockets to be expanded or contracted.

The wheel P is caused to revolve intermittently, moving each time the distance from one pocket to the next, (or it might be made to move the distance of two or more pockets at a time, if preferred.) For imparting these movements I employ a swinging lever 141, the hub of which is mounted on the central shaft 132, so as to turn freely thereon, and the outer end of which is guided by an arc-shaped guide 141', suitably fastened to the frame-work. The outer end of this lever is connected by a link 142 to a lever-arm 143, fixed on an upright shaft 144, to which is fixed another lever-arm carrying a roller guided by a cam-groove in a cam-disk (not shown) fixed on the upright shaft 54, by which means the lever 141 is swung forward and backward at intervals an angular distance equal to the spacing apart of the pockets. The outer part of the lever has longitudinal ways, in which moves a slide 140, carrying a locking-bolt 138, this slide being connected by a rod 150 to cam mechanism for sliding this bolt inward to engage one of a series of notches 137 and outward to disengage these notches. Starting from the position shown, the bolt is first slid outward to free itself from the notch. The lever 141 is then swung back to bring the bolt opposite the next notch 137. The bolt is then slid in to engage this notch, and the lever is then swung forward, so that the bolt carries the wheel P forward one space. To lock it after each movement, a bolt 139 is mounted in a stationary slideway and is driven by a link 149 and lever 147 from a cam, (not shown,) by which this bolt is protruded into a notch as soon as the wheel P comes to rest and holds it until just before the next forward movement, when it is retracted. Any other mechanical means for moving the wheel forward step by step (or even continuously, if preferred) may be used instead of that shown.

At any suitable point in the rotation of the pockets N suitable paper bags are thrust into them one by one, either by hand or by automatic mechanism. These bags are carried around in the pockets, as shown in Fig. 3, during which, if still damp from the paste used in making them, they may be dried by the heat of steam, which may be introduced into the hollow table O or outer wall $g$, Fig. 3. At any suitable point—for example, where indicated by the words "Bag filled here" in Fig. 1—a weighed or measured charge of material to be packed is deposited in the bag. At any suitable subsequent position—for example, where indicated in Fig. 1—gum or glue is applied to the top of the bag, and finally the top of the bag is folded down to inclose the material and form a package—for example, in the position indicated by the words "Top of bag closed here" in Fig. 1. It then becomes necessary to remove the package from the pocket in order to empty the latter and prepare it for receiving a fresh bag. For this purpose, according to the mechanism disclosed in my said Patent No. 564,722, the package in the next position runs off the end of the table O, Fig. 2, and comes over a plunger Y, while another plunger X stands just above it. Thereupon the upper plunger X, which is mounted on a vertical slide 275, moves down upon the top of the package, so that the package is confined between the two plungers, as shown in Fig. 4, whereupon they move down together, carrying the package $a^3$ between them to the position shown in Fig. 3. In this position the package stands opposite a horizontally-moving plunger or pusher Z, mounted on a slide 291, which then advances and pushes the package out from between the two plungers X and Y. In my former machine this pusher pushed the bag into a drying-conduit, where it was engaged between endless belts or conveyer-chains below and above, by which the packages were carried along underneath the pocket-wheel P and finally delivered out of the machine. My present invention provides an improved and much simpler construction instead of this conveying-conduit. The slide 291 is connected by a link 293 with a lever 294, mounted on an upright shaft 295, the other arm of the lever carrying a roller engaged by a cam-groove in a cam 296 fixed on said shaft 54, by which means the requisite forward and backward movements are imparted to the pusher Z.

So far as described the mechanism does not differ from that in my said previous patent.

I will now proceed to describe my present invention.

My invention provides a carrier for receiving the packages after they have been removed from the pockets N, adapted to hold them until their tops shall have become dried or set, and to carry them to any suitable or convenient location where it is desired to have them delivered or expelled from the machine. To this end my invention provides an endless movable carrier for receiving the packages, constructed, preferably, with top and bottom plates adapted to hold the packages between them and mounted to move in an endless path, preferably by being constructed in circular form and made to move concentrically around a center. Preferably the carrier is divided into compartments each adapted to receive one package. The carrier is best constructed concentrically with the central shaft 132, to revolve around this shaft, and for simplicity it is preferable to have it move coincidently with the movement of the pocket-carrying wheel, to which end the simplest and best construction is to mount the carrier on or attach it to this wheel, so that it shall be carried therewith. My invention, however, is not limited to these special details of construction or arrangement.

I will proceed to describe in detail the particular and preferred construction which is shown in the drawings. The package-carrier as a whole is designated 330. It is constructed of two flat circular plates 331 and 332, which are spaced apart a distance approximately equal to the height of the packages. The upper plate 331 is fastened to the rim or ring 130 of the wheel P. The carrier is divided into cells or compartments 333 by means of intervening partitions 334. To render the construction as light as possible, these partitions are made hollow, being preferably formed of plate metal bent into the shape shown in cross-section in Fig. 5. The top and bottom plates are connected together by bolts 335 at intervals, which pass up through the hollow partitions 334 and which screw into lugs projecting from the rim 130, by which all the parts are fastened together and at the same time the carrier is attached to the wheel P. In the particular construction shown the partitions 334 are held in place by being sunk into hollow radial grooves 336, Figs. 6 and 8, in the rings 331 and 332, while to prevent their outward radial displacement the inner ends of the hollow partitions may be elongated, as indicated at 337 in Figs. 7 and 9, projecting thus into notches 338 in the top and bottom plates, Figs. 7 and 8. It results from this construction that the carrier 330 has its compartments 333 equal in number and in spacing to the pockets N. This equality is necessary when the carrier is fixed to the pocket-wheel P, but would not be otherwise. The arrangement is such that when a package is plunged down from a pocket by the plungers X Y a compartment 333 stands exactly in line with it, as shown at the right in Fig. 5, so that upon the movement of the pusher Z it pushes the package into the compartment, advancing to the position shown in dotted lines in Figs. 4 and 5. At the next forward movement of the carrier the next empty compartment 333 is brought into alinement with the pusher. Thus at each movement the carrier has a new package $a^3$ pushed into one of its compartments. The packages are held so firmly between the top and bottom plates of the carrier that the flaps or folds of their closed tops cannot unfold or fly up, the tops of the packages being thus held firmly down for a sufficient time to enable the glue or gum to thoroughly dry and cement them down.

At any convenient discharging position the packages are successively expelled from the compartments of the carrier. This is done by a pusher 340, which may be similar to the pusher Z and which at each stoppage of the carrier advances into the coincident compartment, pushes ahead of it the package and expels the latter onto a table $u$ or any suitable support, and then moves back through the compartment before the next forward movement of the carrier. This pusher 340 may be driven in any suitable manner, as by a cam; but the simplest construction is that shown, wherein this pusher is mounted, through the medium of a suitable bracket 341, on a slide 342, which, as shown, is coincident with or a prolongation of the slide 291, although this is not necessary, as two separate slides might be employed.

The subdivision of the carrier into compartments is not strictly essential, as the top and bottom plates are the only portions of the carrier that need come into contact with the packages, the bottom plate supporting the packages and the top plate serving to hold the top flaps down until they are dry. In Figs. 10 and 11 I have shown a carrier in which the partitions 334 are omitted. The packages are pushed into place between the top and bottom plates by the pusher Z and remain in their proper relative positions by the frictional engagement of the plates with them. The top and bottom plates 331 and 332 are mounted upon radial spokes 343, held at the proper distance apart by studs 344. The expelling-pusher 340 may be mounted on a bracket-arm 345, fastened on the slide 342, the bracket-arm 345 passing between the upper and lower plates, as shown in dotted lines in Fig. 11.

The carrier may be otherwise modified, it being only essential that it shall be an endless carrier adapted to receive the packages and to carry them until their delivery position is reached and then to permit of the expulsion of the packages. For example, any form of endless-chain carrier that is adapted to perform these functions in connection with a machine for making, closing, or otherwise handling packages is within my invention. A suitable construction of chain carrier is shown in Figs. 12 and 13. Each link consists of a plate 346, bent at top and bottom to form the top and bottom plates 331' and 332' of the carrier. The links may be connected together in any suitable way known to makers of chain-gearing or chain conveyers—as, for example, by means of hinge-leaves 347 and 348, engaging hinge pins or pintles 349.

It is not essential that both the top and bottom plates shall be formed as a moving part of the carrier, as either of these plates or even both of them might be made stationary and the packages be pushed along against such stationary plate or plates. In Fig. 14 I have shown the top plate 432 as being stationary, being bolted at intervals to a supporting portion 433 of the main frame of the machine, while the bottom plate 332 is constructed as shown in Fig. 11, being mounted on spokes 343, which connect it to a hub suitably mounted. In this case the partitions 334 are fixed solely to the bottom plate 332.

The carrier may move independently of the pocket-carrying wheel P, although the simplest construction is to have it move therewith. By constructing it to move independently it may move at a different speed or around a different center or in a different direction, as the exigencies of any particular construction of machine may demand.

It sometimes becomes necessary to provide for variations in the height of the packages. This is especially necessary with weighing-machines, where variations in bulk for a given weight have to be provided for by varying the size of the package, and in the machine shown in my said patent means is provided for admitting variations in height of a package. To adapt my present invention to these variations, I may construct either the upper or lower plate of the carrier to yield vertically, in order that it may be displaced more by a package of abnormal height than by the usual package. Preferably it is the top plate that should thus yield, and rather than mount the entire ring 331 to yield it is preferable to provide each compartment of the carrier with an independently-yielding top plate. One suitable construction to this effect is shown in Fig. 15, where the carrier is constructed exactly the same as, for example, in Figs. 4 and 5, except that it is slightly higher than the height of the packages and there is added to each compartment a yielding top plate 350, which may be variously constructed, but preferably is a sheet or plate of spring-steel, which is bent back upon itself and fastened upon the upper ring 331 of the carrier.

I claim as my invention the following-defined novel features, substantially as hereinbefore specified, namely:

1. In a packaging-machine, the combination with means for operating on and delivering packages, of an endless movable carrier for receiving the packages delivered therefrom having top and bottom plates adapted to receive the folded ends of the packages between them and thereby hold them closed, and means for transferring the successive packages to the carrier by pushing them between said plates.

2. In a packaging-machine, the combination with a revoluble wheel carrying a series of pockets for holding bags or packages, of a circular carrier for receiving the packages therefrom, fastened to and turning with said wheel, and having top and bottom plates adapted to receive the folded ends of the packages between them, and thereby hold them closed, means for transferring the successive packages from the pockets to the carrier by pushing them between said plates, and means for finally expelling the packages from the carrier.

3. In a packaging-machine, the combination with a series of pockets for holding bags or packages, comprising side walls embracing such packages, and open at top and bottom, of an endless movable carrier for the packages, consisting of a series of compartments having closed bottoms for supporting the packages, means for transferring the packages successively out of said pockets and into said compartments, and means for finally expelling the packages from said compartments.

4. In a packaging-machine, the combination with a series of pockets for holding bags or packages, comprising side walls embracing such packages, and open at top and bottom, and the packages carried by said pockets with their folded ends at the open top and bottom ends of the pockets, of an endless carrier for the packages, consisting of top and bottom plates between which the folded ends of the packages are received, and by which they are held closed, and intervening partitions by which the carrier is divided into compartments, means for intermittently advancing the pockets and said compartments, means for transferring the packages successively from the pockets to the compartments of the carrier, and means for finally expelling the packages from the compartments.

5. In a packaging-machine, the combination with means for operating on and delivering packages, of an endless movable carrier for receiving the packages delivered therefrom consisting of top and bottom plates adapted to receive the folded ends of the packages between them, and mounted to revolve, and means for transferring the successive packages to the carrier consisting of a pusher Z adapted to push the package between said plates, with its folded ends in contact with said plates.

6. In a packaging-machine, the combination with a series of pockets N, of an endless rotary carrier moving parallel therewith on a different level, and consisting of top and bottom plates between which the package is held, vertically-moving plungers X and Y adapted to grasp the package between them and transfer it out of the pocket and to the level of said carrier, and a pusher Z adapted to push the package from between said plungers into the carrier.

7. In a packaging-machine, an endless carrier for the packages, consisting of continuous top and bottom plates adapted to receive the successive packages between them, combined with a pusher adapted to push the successive packages into said carrier, and a pusher adapted to push the packages successively out from said carrier, with mechanism for operating said pushers connected to move them simultaneously.

8. In a packaging-machine, an endless carrier for the packages consisting of parallel top and bottom plates, a pusher adapted to push the successive packages into said carrier, another pusher adapted to push them successively out of the carrier, a reciprocating slide carrying both said pushers, and driving mechanism for alternately advancing the carrier and reciprocating said slide at intervals.

9. In a packaging-machine, a carrier consisting of upper and lower plates 331 and 332, with intervening radial partitions 334 forming compartments, combined with two pushers arranged to reciprocate into successive compartments for thrusting packages into and out of said compartments.

10. The combination with a wheel P carrying pockets N N, of a carrier 330 fastened beneath and turning with said wheel, consisting of top and bottom plates between which to embrace the packages and means for transferring packages from the pockets of said wheel to said carrier.

11. In a packaging-machine, the combination with means for operating on and delivering packages, of a carrier for receiving the packages having top and bottom plates adapted to receive the folded ends of the packages between them, one of said plates mounted to yield vertically to adapt itself to variations in the height of a package.

12. In a packaging-machine, the combination with means for operating on and delivering packages, of a carrier for receiving the packages having top and bottom plates adapted to receive the folded ends of the packages between them, the top plate being subdivided and constructed as segmental vertically-yielding plates movable to adapt themselves to variations in the height of the successive packages.

In witness whereof I have hereunto signed my name in the presence of two subscribing witnesses.

HENRY E. SMYSER.

Witnesses:
ARTHUR C. FRASER,
GEORGE H. FRASER.